(12) United States Patent
Muraguchi et al.

(10) Patent No.: US 6,340,641 B1
(45) Date of Patent: Jan. 22, 2002

(54) SUBSTRATE FLATTENING METHOD AND FILM-COATED SUBSTRATE MADE THEREBY

(75) Inventors: Ryo Muraguchi; Akira Nakashima; Atsushi Tonai; Michio Kimatsu, all of Kitakyushu; Katsuyuki Machida, Atsugi; Hakaru Kyuragi, Machida; Kazuo Imai, Atsugi, all of (JP)

(73) Assignees: Catalysts & Chemicals Industries Co., Ltd.; Nippon Telegraph and Telephone Corporation, both of (JP)

( * ) Notice: Subject to any disclaimer, the term of this patent is extended or adjusted under 35 U.S.C. 154(b) by 0 days.

(21) Appl. No.: 09/297,343
(22) PCT Filed: Oct. 31, 1997
(86) PCT No.: PCT/JP97/03979
§ 371 Date: Apr. 29, 1999
§ 102(e) Date: Apr. 29, 1999
(87) PCT Pub. No.: WO98/21750
PCT Pub. Date: May 22, 1998

(30) Foreign Application Priority Data

Nov. 11, 1996 (JP) .............................................. 8-298892
Nov. 19, 1996 (JP) .............................................. 8-308427

(51) Int. Cl.$^7$ .............................................. H01L 21/31
(52) U.S. Cl. ...................... 438/763; 438/780; 438/646; 438/427
(58) Field of Search ................................ 438/780, 760, 438/626, 645, 646, 632, 631, 427, 781, 455, 458

(56) References Cited

U.S. PATENT DOCUMENTS

| | | | |
|---|---|---|---|
| 4,865,875 A | 9/1989 | Kellerman | 427/96 |
| 5,312,576 A | 5/1994 | Swei et al. | 264/112 |
| 5,789,325 A | * 8/1998 | Chandra et al. | 438/781 |

FOREIGN PATENT DOCUMENTS

| | | |
|---|---|---|
| CA | 2259048 | 1/1999 |
| DE | 4217224 | 1/1993 |
| EP | 0405947 | 6/1990 |
| EP | 0517475 | 6/1992 |
| EP | 0611067 | 9/1994 |
| JP | 60182138 | 9/1985 |
| JP | 03024726 | 2/1991 |
| JP | 03192215 | 8/1991 |
| JP | 05315319 | 11/1993 |
| JP | 06128529 | 5/1994 |
| JP | 07066188 | 3/1995 |
| JP | 07102217 | 4/1995 |
| JP | 07066188 | * 10/1995 |
| JP | 08176512 | 7/1996 |
| TW | 288214 A | 10/1996 |

* cited by examiner

Primary Examiner—Charles Bowers
Assistant Examiner—Yennhu B. Huynh
(74) Attorney, Agent, or Firm—Webb Ziesenheim Logsdon Orkin & Hanson, P.C.

(57) ABSTRACT

The present invention provides a method of easily planarizing the uneven surface of a substrate having an uneven surface. This method comprises the steps of forming a coating film containing spherical fine particles on a surface of a smooth substrate; sticking the surface of the smooth substrate provided with the coating film containing spherical fine particles to the uneven surface of a substrate having an uneven surface; and transferring the coating film containing spherical fine particles to the uneven surface of the substrate so that the uneven surface is planarized.

20 Claims, 2 Drawing Sheets

SUBSTRATE FLATTENING METHOD AND FILM-COATED SUBSTRATE MADE THEREBY

BACKGROUND OF THE INVENTION

The present invention relates to a method of planarizing a substrate surface and a substrate with coating film. More particularly, the present invention relates to a method of planarizing an uneven surface of a substrate having an uneven surface, such as a semiconductor substrate, by forming a coating film thereon and relates to a substrate with coating film having its surface planarized by the above method, and a process for producing a semiconductor device, in which the above method is employed for planarizing an uneven surface of a semiconductor substrate.

With respect to various electronic components such as liquid crystal display elements for color display and semiconductor elements having a laminate structure, level differences attributed to, for example, wiring or a color filter occur on the substrate during a process of manufacture or production thereof and, therefore, it is needed to planarize the unevenness or irregularity caused by these level differences. In particular, with respect to semiconductor devices, it is needed to attain the complete planarization of the surface of an interlayer insulating film provided between wirings in order to realize a high-density integrated circuit.

Representative techniques for the above planarizing method are, for example, the hitherto proposed SOG (spin on glass) method, etch back method and lift-off method. For example, the SOG method comprises applying an SOG material consisting of a coating liquid containing an alkoxysilane such as $Si(OR)_4$ on an uneven surface of a substrate and heating/curing the SOG material to thereby planarize the uneven surface of a substrate by forming an SOG film thereon, for which various processes have been proposed. Further, other than the above alkoxysilane, various organo-silicon compounds have been proposed as a component of the SOG material.

However, the SOG method encounters the problem of the stability and superintendence of the coating liquid because the coating liquid is applied on the substrate. Moreover, the deterioration of hot carrier resistance of the MOS transistor attributed to the moisture contained in the SOG film has recently been reported and, hence, the control of moisture has also surfaced as a problem.

On the other hand, the etch back method encounters the problem of dust occurrence because the resist and insulating film are simultaneously etched. Thus, the etch back method is not an easy technique from the viewpoint of dust superintendence. Furthermore, the lift-off method encounters the problem of lift-off failure because employed stencil material is not completely dissolved away at the time of lift-off. Thus, the practical application of the lift-off method has not yet been realized because of the unsatisfactory controllability and yield.

The present invention has been made in these circumstances, and an object of the present invention is to provide a method of easily planarizing the uneven surface of a substrate having an uneven surface, a substrate with coating film which is excellent in flatness and has a uniform thickness, and a process for producing a semiconductor device with a planarized semiconductor substrate.

SUMMARY

The method of planarizing a surface of a substrate having an uneven surface according to the present invention comprises the steps of:

forming a coating film containing spherical fine particles on a surface of a smooth substrate;

sticking the surface of the smooth substrate provided with the coating film containing spherical fine particles to the uneven surface of a substrate; and transferring the coating film containing spherical fine particles to the uneven surface of the substrate so that the uneven surface is planarized.

In the present invention, the surface of the smooth substrate may be first furnished with a layer of spherical fine particles, and then a coating liquid may be applied onto the layer of spherical fine particles to thereby form the coating film containing spherical fine particles. Alternatively, the surface of the smooth substrate may be applied with a coating liquid for film formation which contains spherical fine particles on the uneven surface to thereby form the coating film containing spherical fine particles.

Further, the planarization of the uneven surface may be accomplished by the method wherein, at the time of transferring the coating film containing spherical fine particles to the uneven surface of the substrate, or thereafter, the coating film containing spherical fine particles is heated so that at least part of the coating film is melted to thereby planarize the surface of the coating film, and subsequently, the temperature is further raised so that the coating film containing spherical fine particles is cured to thereby accomplish the planarization of the uneven surface of the substrate.

It is preferred that the spherical fine particles are fine particles of silica, and that the coating film is a coating film containing a silicon-based component. Further, it is preferred that the coating film be formed from a coating liquid which contains a polysilazane having a repeating unit represented by the general formula [1]:

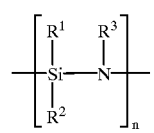

[1]

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater.

The substrate with a coating film according to the present invention has its surface planarized by the above method.

The process for producing a semiconductor device according to the present invention comprises the steps of forming a coating film containing fine particles of silica by applying a coating liquid containing a polysilazane having a repeating unit represented by the above general formula [1] on a surface of a smooth substrate; and transferring the coating film containing fine particles of silica to an uneven surface of a semiconductor substrate so that the semiconductor substrate surface is furnished with the coating film containing fine particles of silica.

DESCRIPTION OF MARK

Figure 1A:
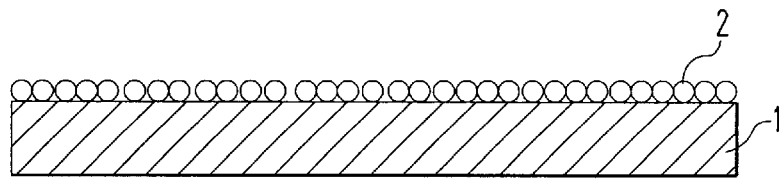
FIGS. 1(a)–(d) are sectional views showing in sequence the steps of the method of planarizing an uneven surface of a substrate according to one preferred embodiment of the present invention.

1: smooth substrate,
2: layer of spherical fine particles,
3: coating film,
4: substrate having an uneven surface,
5: uneven surface,
6: flat plate,
7: layer of fine particles of silica,
8: coating film containing a silicon-based component,
9: semiconductor substrate,
10: Al electrode wiring layer,
11: flat plate (quartz plate), and
12: heater

DETAILED DESCRIPTION OF THE INVENTION

The present invention will be described in detail below.

Method of planarizing a substrate

In the method of planarizing an uneven surface of a substrate according to the present invention, first, a coating film containing spherical fine particles is formed on a surface of a smooth substrate.

Examples of the spherical fine particles include spherical fine particles composed of an inorganic compound such as silica or alumina, spherical fine particles composed of a synthetic resin such as polystyrene or polymethyl methacrylate or its mixture. Of these, fine particles of silica are the most suitable.

The average particle size of these spherical fine particles is preferably 1 μm or less, still preferably 0.5 μm or less. Use may be made of both spherical fine particles exhibiting a single particle size range and those consisting of a mixture of at least two types of spherical fine particles exhibiting different particle sizes. When the coating film containing these spherical fine particles is pressed and thus transferred to an uneven surface of a substrate, the spherical fine particles function as a gap control material between the surface of the smooth substrate and the uneven surface of the substrate to thereby enable uniformly controlling the thickness of the transferred coating film and concurrently improving the flatness of the coating film. Moreover, these spherical fine particles have the capability of controlling the adherence and peelability between the smooth substrate and the coating film to thereby enable enhancing the transfer characteristics of the coating film.

The coating film containing a silicon-based component is preferably used as the coating film formed on the surface of the smooth substrate. This coating film can be easily formed by applying a coating liquid which contains a silicon-based component for film formation on the surface of the smooth substrate.

Although conventional silicon-based components can be used as the film forming component, it is especially preferred that the film forming component be one exhibiting such a reflow property that the viscosity at 100 to 300° C. does not exceed $10^3$ poise. The terminology "reflow property" used herein defines that, when the coating film obtained by applying a coating liquid for film formation to a substrate and drying to solidify the same is heated, the viscosity thereof is lowered in accordance with the rise of the heating temperature to thereby induce a re-melt. Further raising the temperature after the re-melt advances the polymerization of the film forming component with the result that the coating film is cured.

Examples of the silicon-based components having the above reflow property include polysilazanes having a repeating unit represented by the following general formula [1], polycarbosilanes having a repeating unit represented by the following general formula [2] and silsesquioxanes having a repeating unit represented by the following general formula [3]. Of these, polysilazanes are the most suitable.

The general formulae are:

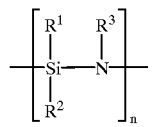

[1]

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater;

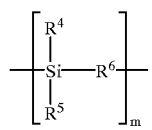

[2]

wherein $R^4$ and $R^5$ may be identical with each other or different from each other and represent a hydrogen atom, an alkoxy, aryl or alkyl, either unsubstituted or substituted, having 1 to 8 carbon atoms, $R^6$ represents an unsubstituted or substituted methylene group, and m is an integer of 1 or greater; and

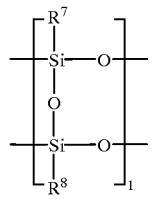

[3]

wherein $R^7$ and $R^8$ may be identical with each other or different from each other and represent a hydrogen atom, an alkoxy, aryl or alkyl, either unsubstituted or substituted, having 1 to 8 carbon atoms, and l is an integer of 1 or greater.

The number average molecular weight of each of the above polysilazane, polycarbosilane and silsesquioxane is preferably in the range of 500 to 50,000, still preferably 1,000 to 10,000.

The coating liquid for film formation for use in the present invention comprises the above film forming component dissolved in an organic solvent at a solid concentration of 5 to 50% by weight, preferably 10 to 30% by weight. Although the organic solvent is not particularly limited as long as it is capable of dispersing or dissolving the above film forming component to thereby impart the fluidity as a coating liquid, preferred use is made of an aromatic hydrocarbon such as toluene or xylene or a halogenated hydrocarbon such as chloroform.

In the present invention, the surface to be coated of the smooth substrate is coated with the above coating liquid for film formation by any of various methods such as the spray, spinner, dipping, roll coating, screen printing and transfer printing methods, and heating is effected at 50° C. or higher to thereby dry the coating. Thus, a coating film can be formed. When the heating temperature is 50° C. or higher, the solvent does not remain in the coating film to thereby produce voids at the time of the transfer. However, when the heating temperature is extremely high, the crosslinking reaction of the film forming component is advanced to thereby deteriorate the reflow property of the coating film, so that the transfer to the uneven surface of the substrate and the planarization of the transferred coating film may become difficult. Therefore, the heating temperature is preferably 300° C. or below, still preferably 200° C. or below.

The thickness of the coating film to be formed on the surface of the smooth substrate is generally in the range of 0.3 to 5 μm, preferably 0.5 to 2 μm.

In the present invention, at the time of the formation of the coating film on the smooth substrate surface, the spherical fine particles may be contained in the coating film either by first furnishing the smooth substrate surface with a layer of spherical fine particles and subsequently coating the layer of spherical fine particles with a coating liquid for film formation or by applying a coating liquid for film formation which contains spherical fine particles onto the surface of the smooth substrate.

Although the method of forming the layer of spherical fine particles on the surface of the smooth substrate in advance is not particularly limited, the fine particle layer is generally formed by applying dispersion of spherical fine particles in a dispersion medium by, for example, the spinner method, on the smooth substrate, followed by drying. As the dispersion medium water, alcohols, ketones and ethers et al. are used.

When the spherical fine particles are contained in the coating liquid for film formation, it is not necessary to form the layer of spherical fine particles on the surface of the smooth substrate in advance as mentioned above. In this instance, the coating film containing spherical fine particles can be formed only by directly applying the coating liquid for film formation in which spherical fine particles are dispersed onto the surface of the smooth substrate. These spherical fine particles are preferably contained in the coating liquid for film formation in an amount, in terms of solid contents, of 2 to 50% by weight, still preferably 5 to 20% by weight.

The smooth substrate for use in the present invention is not particularly limited as long as the surface thereof is smooth. Sheet films of, for example, a flexible thermoplastic resin are generally used as the smooth substrate. Examples of these sheet films include sheet films of an acrylic resin, a polycarbonate resin, a polyolefin resin, a vinyl chloride resin, a polyimide resin, a polyimidoamide resin and a fluororesin. Of these, sheet films of a polyimide resin and a fluororesin are preferred from the viewpoint of heat resistance. The use of these sheet films of flexible thermoplastic resins as the smooth substrate facilitates the pressing to the substrate having an uneven surface at the time of transfer.

Subsequently, in the present invention, the coating film containing spherical fine particles, which has been formed on the surface of the smooth substrate by the above method, is transferred to the uneven surface of the substrate having an uneven surface.

The transfer is performed in the following manner. The coating film formation side of the smooth substrate and the uneven surface of the uneven substrate are stuck to each other. The coating film side and the uneven surface are pressed and connected to each other by applying a load of, for example, 1 to 50 kg, preferably 1 to 10 kg, to either or both backs of the smooth substrate and the substrate having an uneven surface or by moving a roller thereon. Thereafter, the smooth substrate is stripped away to thereby accomplish the transfer of the coating film to the uneven surface.

When the coating film is transferred to the uneven surface of the substrate as mentioned above, or thereafter, the coating film may be heated so that at least part of the coating film is melted to thereby planarize the surface of the coating film containing spherical fine particles. The above coating film containing the silicon-based component possesses the reflow property as mentioned above and, at about 100° C. or higher, exhibits a viscosity lowering and re-melts (reflows). This viscosity lowering is observed up to about 250° C. and, when the temperature rises to about 300° C. or higher, a curing by molecular crosslinking is initiated. When, with the utilization of the above reflow property, the coating film is heated to 50° C. or higher, preferably 80° C. or higher, to thereby lower the viscosity thereof when the coating film is pressed and connected to the uneven surface of the substrate and, thereafter, is transferred, the load and heat applied at the transfer induce the reflow and expansion of the coating film with the result that the surface of the uneven substrate can be planarized to a high degree.

Also, the uneven surface of the substrate can be planarized by first conducting a transfer under pressure and thereafter heating, as in the thermocompression bonding.

The thus transferred coating film is heated at 300 to 500° C., preferably 400 to 450° C., for 10 to 120 min, preferably 30 to 60 min, so that the coating film is cured. This curing is generally performed in air, an atmosphere of steam or an atmosphere of ammonia. In the present invention, when the spherical fine particles are composed of a synthetic resin, it may occur that the spherical fine particles melt or are decomposed during the above heating or curing of the coating film with the result that the spherical form is destroyed. In this connection, it is not necessary to maintain the spherical form after the transfer to the uneven surface of the substrate, and it is only required that the spherical fine particles be contained in the coating film during the transfer.

The method of planarizing a substrate having an uneven surface according to one preferred embodiment of the present invention will be described below with reference to FIG. 1.

First, referring to FIG. 1(a), layer of spherical fine particles 2 is formed on a surface of sheet film 1 as the smooth substrate.

Figure 1B:
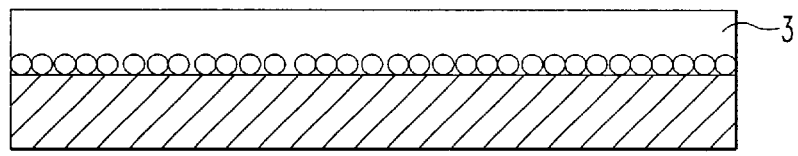

Subsequently, referring to FIG. 1(b), the above coating liquid for film formation is applied on the layer of spherical fine particles 2 by customary means and heated at 50° C. or higher, so that coating film 3 containing the layer of spherical fine particles is formed on the sheet film.

Figure 1C:
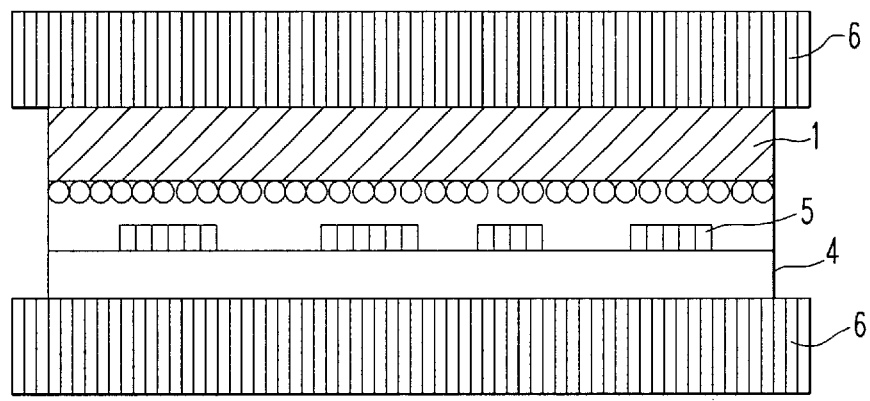

Thereafter, referring to FIG. 1(c), the surface of the thus obtained coating film containing spherical fine particles and the uneven surface 5 of the substrate 4 having an uneven surface are stuck to each other in a fashion meeting each other.

In the sticking thereof, the sheet film 1 and the substrate 4 are placed between two flat plates 6, for example, flat quartz plates, in such a manner that the coating film surface and the uneven surface 5 meet each other, and a load is applied to either or both of the sheet film side and the substrate side. Further, heating is conducted at 80 to 150° C., so that the coating film containing spherical fine particles 3 of the sheet film 1 is transferred to the uneven surface 5.

Figure 1D:
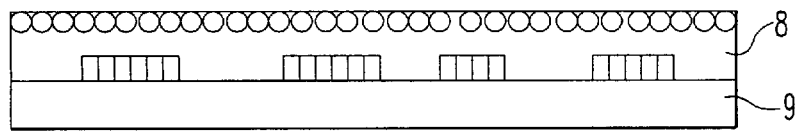

The uneven surface 5 having the coating film containing spherical fine particles 3 transferred thereto is heated at about 400° C. for curing. Thus, there is obtained the substrate with a coating film 3 which has its surface planarized, as shown in FIG. 1(d).

Substrate with Coating Film

In the substrate with coating film according to the present invention, the unevenness or irregularity of the substrate surface is planarized by the coating film formed by the above method.

In this substrate, use can be made of any substrates having an uneven surface on which the coating film can be formed by the above method. Examples of the substrates having an uneven surface include an optical disk or magnetic disk for high-density recording, a CCD element fitted with microlenses, a display front panel of a cathode ray tube, liquid crystal display or the like, a transparent electrode plate fitted with color filter of a liquid crystal display unit for color display, a transparent electrode plate fitted with TFT for liquid crystal display and a semiconductor element with multilayer structure.

For example, in a transparent electrode plate fitted with TFT for liquid crystal display, the insulating coating film is formed on a substrate surface having TFTs (thin film transistors) protrudently disposed thereon, so that level differences between the substrate surface and the TFT portions are planarized. In a transparent electrode plate fitted with color filter of a liquid crystal display unit for color display, the coating film is formed on a picture element electrode of an electrode plate and a color filter of a counter electrode plate, so that level differences produced by the picture element electrode and the color filter are planarized by the coating film containing spherical fine particles.

Moreover, in a semiconductor device, the insulating coating film is formed between the semiconductor substrate and a metal wiring layer and between metal wiring layers. This insulating coating film planarizes the uneven surfaces produced by various elements, such as a PN junction semiconductor, a condenser element and a resistor element, provided on the semiconductor substrate.

The above semiconductor device is produced by the following process.

The process for producing a semiconductor device according to the present invention comprises the steps of forming a coating film containing fine particles of silica on a surface of a smooth substrate; and transferring the coating film containing fine particles of silica to the uneven surface of a semiconductor substrate so that the semiconductor substrate surface is planarized with the coating film of high flatness. In this process, the coating film is preferably formed from a coating liquid which contains a polysilazane having a repeating unit represented by the above general formula [1].

The above process for producing a semiconductor device will be described below with reference to FIG. 2. First, referring to FIG. 2(a), layer of fine silica particles 7 is formed on a surface of sheet film 1 as the smooth substrate.

Figure 2A:
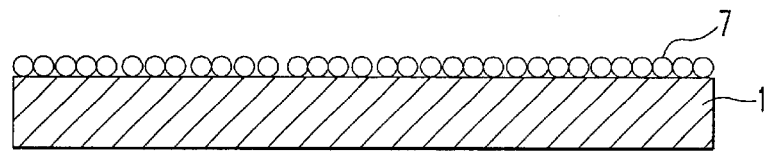
FIGS. 2(a)–(f) are sectional views showing in sequence the steps of the process for producing a semiconductor device with a planarized semiconductor substrate according to one preferred embodiment of the present invention.
Figure 2B:
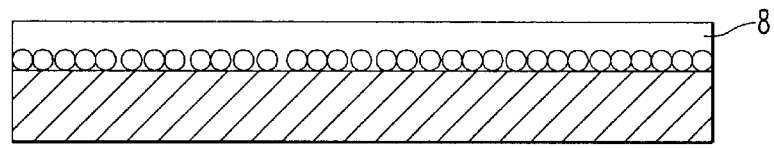

Subsequently, referring to FIG. 2(b), the above coating liquid for film formation is applied on the layer of fine silica particles 7 by, for example, the spinner method and heated at 50° C. or higher, so that the coating film 8 containing the layer of fine silica particles is formed on the sheet film.

Figure 2C:
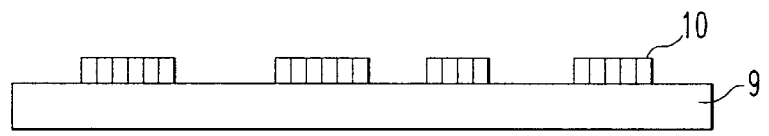
Figure 2D:
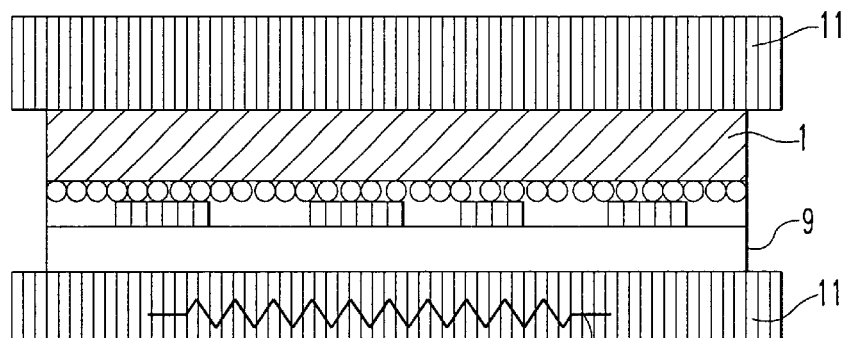

Thereafter, the surface of the above coating film containing fine silica particles and Al electrode wiring layer 10 of semiconductor substrate 9 as shown in FIG. 2(c) are stuck to each other in a fashion meeting each other. In the sticking thereof, referring to FIG. 2(d), the sheet film and the semiconductor substrate are placed between two flat plates 11, for example, flat quartz plates, in such a manner that the coating film surface and the wiring layer 10 meet each other, and a load is applied to either or both of the sheet film 1 side and the semiconductor substrate 9 side. Further, heating is conducted at 80 to 200° C. with the use of heater 12, so that the coating film 8 of the sheet film 1 is transferred to the wiring layer 10.

Figure 2E:
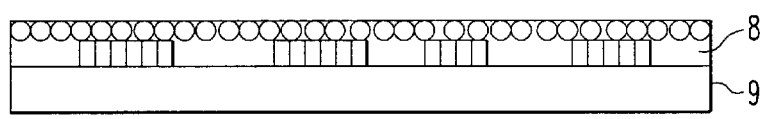

After the transfer, the wiring layer 10 having the coating film 8 transferred thereto is heated at about 400° C. for curing. Thus, there is obtained the semiconductor device furnished with the coating film 8 containing fine silica particles, which has its surface planarized as shown in FIG. 2(e).

Figure 2F:
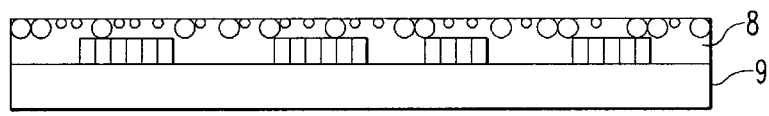

In the above process for producing a semiconductor device according to the present invention, as the fine silica particles, use may be made of two types of fine silica particles having different particle sizes. When these fine particles are employed, a coating film as shown in FIG. 2(f) is formed on the semiconductor surface.

In the present invention, the spherical fine particles contained in the coating film during the transfer step function as a gap regulator between the smooth substrate and the substrate having an uneven surface, thereby enabling the formation of the planarized coating film of uniform thickness. Further, the adherence of the coating film to the smooth substrate and the peelability of the coating film from the smooth substrate can be controlled by causing the coating film to contain the spherical fine particles, so that the transfer thereof to the uneven surface of the substrate can be carried out smoothly.

Moreover, in the formation of the coating film from the coating liquid for film formation which contains the film forming component having the reflow property, the transfer of the coating film with the utilization of the reflow property enables the formation of a very flat coating film on the uneven surface of the substrate.

The production of the semiconductor device with the use of the above method enables forming the planarized coating film of uniform thickness on the semiconductor substrate of large size.

EXAMPLE

The present invention will be further illustrated below with reference to the following Examples, which in no way limit the scope of the invention.

Example 1

A sheet film of Teflon having a thickness of 300 $\mu$m was coated with an ethanol dispersion of fine particles of silica having an average particle size of 0.5 $\mu$m ($SiO_2$ concentration: 5% by weight) by the spinner method (500 rpm, 30 sec) and dried, thereby forming a layer of fine silica particles on the sheet film.

Subsequently, a polycarbosilane-containing coating liquid for film formation (solvent: methyl isobutyl ketone, $SiO_2$ concentration: 25% by weight, produced by NIPPON CARBIDE INDUSTRIES CO., LTD.) was applied onto the layer of fine silica particles by the spinner method (2000 rpm, 20 sec) and dried at 120° C. on a hot plate for 3 min, thereby obtaining a coating film of 1 $\mu$m thickness containing fine silica particles.

A model substrate having 0.5 μm level differences on its surface was prepared. Then, the uneven surface of the model substrate and the above sheet film were stuck to each other so that the uneven surface side and the coating film side met each other, and arranged between two flat plates. A load of 5 kg was applied onto the flat plates, and heating was performed at 150° C. for 10 min. Thus, not only the transfer of the coating film but also the planarization thereof was carried out. Thereafter, the sheet film was stripped off, and the substrate having the transferred coating film was heated at 400° C. in a steam atmosphere for 30 min so that the coating film was cured. The viscosity of this coating film at 150° C. was 15 poise.

The thus obtained coating film containing fine silica particles had a thickness of 0.5 μm at the level difference portion. A section of the coating film was observed by an electron microscope, and it was found that the coating film had desirable flatness.

Example 2

A coating film was formed on a model substrate in the same manner as in Example 1, except that the fine particles of silica consisted of a 1:1 (weight ratio) mixture of fine particles having an average particle size of 0.5 μm and fine particles having an average particle size of 0.1 μm.

The thus obtained coating film containing fine silica particles had a thickness of 0.5 μm at the level difference portion. A section of the coating film was observed by an electron microscope, and it was found that the coating film had desirable flatness.

Example 3

A polycarbosilane-containing coating liquid for film formation (solvent: methyl isobutyl ketone, $SiO_2$ concentration: 25% by weight, produced by NIPPON CARBIDE INDUSTRIES CO., LTD.) in which fine particles of silica having an average particle size of 0.3 μm were dispersed in an amount of 30% by weight was applied onto the same sheet film as in Example 1 which was not furnished with the fine particle layer by the spinner method (2000 rpm, 20 sec), thereby obtaining a coating film containing fine silica particles. The obtained coating film was treated in the same manner as in Example 1.

The thus obtained coating film containing fine silica particles had a thickness of 0.5 μm at the level difference portion. A section of the coating film was observed by an electron microscope, and it was found that the coating film had desirable flatness.

Example 4

A sheet film of Teflon® having a thickness of 300 μm was coated with an ethanol dispersion of fine particles of silica having an average particle size of 0.1 μm ($SiO_2$ concentration: 5% by weight) by the spinner method (500 rpm, 30 sec) and dried, thereby forming a layer of fine silica particles on the sheet film.

Subsequently, an inorganic polysilazane-containing coating liquid for film formation (Ceramate-CIP, $SiO_2$ concentration: 24% by weight, produced by Catalysts & Chemicals Industries Co., Ltd.) was applied onto the layer of fine silica particles by the spinner method (2000 rpm, 20 sec) and dried at 120° C. on a hot plate for 3 min, thereby obtaining a coating film of 0.4 μm thickness containing fine silica particles.

A model substrate having 0.2 μm level differences on its surface was prepared. Then, the uneven surface of the model substrate and the above sheet film were stuck to each other so that the uneven surface side and the coating film side met each other, and arranged between two flat plates. A load of 5 kg was applied onto the flat plates, and heating was performed at 150° C. for 10 min. Thus, the transfer of the coating film was carried out. Thereafter, the sheet film was stripped off, and the substrate having the transferred coating film was heated at 400° C. in a steam atmosphere for 30 min so that the coating film was cured. The viscosity of this coating film at 150° C. was 2.5 poise.

The thus obtained coating film containing fine silica particles had a thickness of 0.2 μm at the level difference portion. A section of the coating film was observed by an electron microscope, and it was found that the coating film had desirable flatness.

Example 5

A sheet film of Teflon® having a thickness of 200 μm was coated with an ethanol dispersion of fine particles of silica having an average particle size of 0.3 μm ($SiO_2$ concentration: 5% by weight) by the spinner method (500 rpm, 30 sec) and dried, thereby forming a layer of fine silica particles on the sheet film. Subsequently, an inorganic polysilazane-containing coating liquid for film formation (Ceramate-CIP, $SiO_2$ concentration: 24% by weight, produced by Catalysts & Chemicals Industries Co., Ltd.) was applied onto the layer of fine silica particles by the spinner method (2000 rpm, 20 sec) and dried at 120° C. on a hot plate for 3 min, thereby obtaining a coating film of 0.6 μm thickness containing fine silica particles.

A semiconductor substrate having Al wiring and the above sheet film were stuck to each other so that the Al wiring side and the coating film side met each other, and arranged between two flat plates. A load of 5 kg was applied onto the flat plates, and heating was performed at 150° C. for 10 min. Thus, the transfer of the coating film was carried out. Thereafter, the sheet film was stripped off, and the semiconductor substrate having the transferred coating film was heated at 400° C. in a steam atmosphere for 30 min so that the coating film was cured.

The thus obtained coating film containing fine silica particles, formed on the semiconductor substrate, had a thickness of 0.3 μm on the Al wiring. A section of the coating film was observed by an electron microscope, and it was found that the coating film had desirable flatness.

Example 6

A coating film was formed on a model substrate in the same manner as in Example 5, except that the fine particles of silica consisted of a 1:1 (weight ratio) mixture of fine particles having an average particle size of 0.3 μm and fine particles having an average particle size of 0.1 μm.

Subsequently, an inorganic polysilazane-containing coating liquid for film formation (Ceramate-CIP, $SiO_2$ concentration: 30% by weight, produced by Catalysts & Chemicals Industries Co., Ltd.) was applied onto the layer of fine silica particles by the spinner method (1000 rpm, 20 sec) and dried at 120° C. on a hot plate for 3 min, thereby obtaining a coating film of 1 μm thickness containing fine silica particles.

The obtained coating film containing fine silica particles was transferred to a semiconductor substrate in the same manner as in Example 5 and cured.

The thus obtained coating film containing fine silica particles, formed on the semiconductor substrate, had a thickness of 0.5 μm on Al wiring. A section of the coating film was observed by an electron microscope, and it was found that the coating film had desirable flatness.

Example 7

An inorganic polysilazane-containing coating liquid for film formation (Ceramate-CIP, SiO$_2$ concentration: 24% by weight, produced by Catalysts & Chemicals Industries Co., Ltd.) in which fine particles of silica having an average particle size of 0.3 μm were dispersed in an amount of 30% by weight was applied onto a sheet film not furnished with any fine particle layer by the spinner method (2000 rpm, 20 sec) and dried at 120° C. on a hot plate for 3 min, thereby obtaining a coating film of 0.6 μm thickness containing fine silica particles.

The obtained coating film containing fine silica particles was transferred to a semiconductor substrate in the same manner as in Example 5 and cured.

The thus obtained coating film containing fine silica particles, formed on the semiconductor substrate, had a thickness of 0.3 μm on Al wiring. A section of the coating film was observed by an electron microscope, and it was found that the coating film had desirable flatness.

What is claimed is:

1. A method of planarizing a surface of a substrate having an uneven surface, which comprises the steps of:

forming a coating film containing spherical fine particles on a surface of a smooth substrate;

sticking the surface of the smooth substrate provided with the coating film containing spherical fine particles to the uneven surface of the substrate having an uneven surface; and transferring the coating film containing spherical fine particles from the surface of the smooth substrate to the uneven surface of the substrate having an uneven surface so that the uneven surface is planarized.

2. The method as claimed in claim 1, wherein the surface of the smooth substrate is first furnished with a layer of spherical fine particles, and followed by applying a coating liquid for film formation onto the layer of spherical fine particles to thereby form the coating film containing spherical fine particles.

3. The method as claimed in claim 1, wherein the surface of the smooth substrate is applied with a coating liquid for film formation which contains spherical fine particles to thereby form the coating film containing spherical fine particles.

4. The method as claimed in claim 1, wherein, at the time of transferring the coating film containing spherical fine particles to the uneven surface of the substrate having an uneven surface, or thereafter, the coating film containing spherical fine particles is heated so that at least part of the coating film is melted to thereby planarize the surface of the coating film, and subsequently, the temperature is further raised so that the coating film containing spherical fine particles is cured to thereby accomplish the planarization of the uneven surface of the substrate having an uneven surface.

5. The method as claimed in claim 1, wherein the spherical fine particles are fine particles of silica and the coating film is a coating film containing a silicon-based component.

6. The method as claimed in claim 5, wherein the coating film is formed from a coating liquid which contains a polysilazane having a repeating unit represented by the general formula [1]:

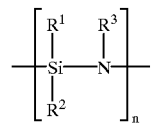

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater.

7. A substrate with a coating film having its surface planarized by the method as claimed in claim 1.

8. A process for producing a semiconductor device, comprising the steps of forming a coating film containing fine particles of silica by applying a coating liquid containing a polysilazane having a repeating unit represented by the above general formula [1] on a surface of a smooth substrate; and transferring the coating film containing fine particles of silica to an uneven surface of a semiconductor substrate so that the semiconductor substrate surface is furnished with the coating film containing fine particles of silica.

9. The method as claimed in claim 2, wherein, at the time of transferring the coating film containing spherical fine particles to the uneven surface of the substrate having an uneven surface, or thereafter, the coating film containing spherical fine particles is heated so that at least part of the coating film is melted to thereby planarize the surface of the coating film, and subsequently, the temperature is further raised so that the coating film containing spherical fine particles is cured to thereby accomplish the planarization of the uneven surface of the substrate having an uneven surface.

10. The method as claimed in claim 3, wherein, at the time of transferring the coating film containing spherical fine particles to the uneven surface of the substrate having an uneven surface, or thereafter, the coating film containing spherical fine particles is heated so that at least part of the coating film is melted to thereby planarize the surface of the coating film, and subsequently, the temperature is further raised so that the coating film containing spherical fine particles is cured to thereby accomplish the planarization of the uneven surface of the substrate having an uneven surface.

11. The method as claimed in claim 2, wherein the spherical fine particles are fine particles of silica and the coating film is a coating film containing a silicon-based component.

12. The method as claimed in claim 3, wherein the spherical fine particles are fine particles of silica and the coating film is a coating film containing a silicon-based component.

13. The method as claimed in claim 4, wherein the spherical fine particles are fine particles of silica and the coating film is a coating film containing a silicon-based component.

14. The method as claimed in claim 11, wherein the coating film is formed from a coating liquid which contains a polysilazane having a repeating unit represented by the general formula [1]:

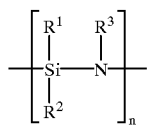

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater.

15. The method as claimed in claim 12, wherein the coating film is formed from a coating liquid which contains a polysilazane having a repeating unit represented by the general formula [1]:

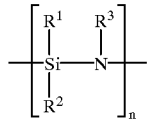

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater.

16. The method as claimed in claim 13, wherein the coating film is formed from a coating liquid which contains a polysilazane having a repeating unit represented by the general formula [1]:

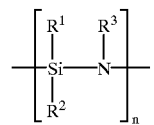

wherein $R^1$, $R^2$ and $R^3$ may be identical with each other or different from each other and represent a hydrogen atom, an alkoxy, aryl or alkyl having 1 to 8 carbon atoms, and n is an integer of 1 or greater.

17. A substrate with a coating film having its surface planarized by the method as claimed in claim 4.

18. A substrate with a coating film having its surface planarized by the method as claimed in claim 5.

19. A substrate with a coating film having its surface planarized by the method as claimed in claim 6.

20. A substrate with a coating film having its surface planarized by the method as claimed in claim 14.

* * * * *

UNITED STATES PATENT AND TRADEMARK OFFICE
CERTIFICATE OF CORRECTION

PATENT NO.     : 6,340,641 B1                                               Page 1 of 1
DATED          : January 22, 2002
INVENTOR(S)    : Ryo Muraguchi et al.

It is certified that error appears in the above-identified patent and that said Letters Patent is hereby corrected as shown below:

<u>Column 1,</u>
Line 63, the heading "SUMMARY" should read -- SUMMARY OF THE INVENTION --.

<u>Column 9,</u>
Line 34, "$Sio_2$" should read -- $SiO_2$ --.

Signed and Sealed this

Fourth Day of June, 2002

Attest:

Attesting Officer

JAMES E. ROGAN
Director of the United States Patent and Trademark Office